United States Patent
Schlüter (10) Patent No.: US 6,843,161 B2
(45) Date of Patent: Jan. 18, 2005

(54) VACUUM BRAKE BOOSTER WITH MECHANICAL EMERGENCY BRAKING AID

(75) Inventor: Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/274,025

(22) Filed: Oct. 18, 2002

(65) Prior Publication Data

US 2003/0041726 A1 Mar. 6, 2003

Related U.S. Application Data

(63) Continuation of application No. PCT/EP01/04190, filed on Apr. 11, 2001.

(30) Foreign Application Priority Data

Apr. 19, 2000 (DE) .......................................... 100 19 423

(51) Int. Cl.[7] .................................................... F15B 9/10
(52) U.S. Cl. ..................................................... 91/369.2
(58) Field of Search .............................. 91/369.2, 369.3, 91/376 R (56) References Cited

U.S. PATENT DOCUMENTS

| | | | |
|---|---|---|---|
| 6,186,042 B1 * | 2/2001 | Levrai et al. ............... | 91/369.2 |
| 6,408,738 B1 | 6/2002 | Harth et al. ................ | 91/369.2 |
| 6,422,124 B1 | 7/2002 | Schonlau et al. ........... | 91/369.2 |

FOREIGN PATENT DOCUMENTS

| | | |
|---|---|---|
| DE | 197 41 133 | 3/1999 |
| DE | 198 31 961 | 1/2000 |
| DE | 198 31 962 | 1/2000 |
| DE | 198 41 150 | 3/2000 |
| WO | 99/26826 | 6/1999 |

* cited by examiner

*Primary Examiner*—F. Daniel Lopez
(74) *Attorney, Agent, or Firm*—MacMillan, Sobanski & Todd, LLC (57) ABSTRACT

A vacuum brake booster (10) is described, comprising a vacuum chamber (16) and a working chamber (18) separated from each other by a movable wall (14), as well as a control valve (20) which comprises a housing (22) coupled workingly to the movable wall and which is capable of controlling the supply of atmospheric pressure or above-atmospheric pressure to the working chamber (18) in dependence upon the displacement of an input element (26) of the brake booster (10) to achieve a pressure difference at the movable wall (14). The vacuum brake booster (10) has a sensing disk (30), which is disposed in an axially displaceable manner inside the control valve housing (22), as well as a coupling device (66), which introduces forces acting counter to the actuating direction upon the sensing disk (30) in a coupled position into the control valve housing (22) and in an uncoupled position via an actuating piston (28) into the input element (26). The coupling device (66) comprises a coupling element (70) for introducing forces acting counter to actuating direction into the control valve housing (22) as well as an axially displaceable actuating element (72). The coupling device (66) further comprises a detent element (74), which is movable in radial direction and disposed radially outside of the coupling element (70), and the coupling element (70), radially at the outside, has a stop (70B) for the detent element (74), wherein in the coupled position the forces acting counter to actuating direction are introduced by the coupling element (70) via the stop (70B) and the detent element (74) into the control valve housing (22).

17 Claims, 4 Drawing Sheets

VACUUM BRAKE BOOSTER WITH MECHANICAL EMERGENCY BRAKING AID

CROSS REFERENCE TO RELATED APPLICATIONS

This application is a continuation of International Application No. PCT/EP01/04190 filed Apr. 11, 2001, which claimed priority to German Patent Application No. 10019423.0 filed Apr. 19, 2000, the disclosures of which are incorporated herein by reference.

BACKGROUND OF THE INVENTION

The invention relates to a vacuum brake booster comprising a vacuum chamber and a working chamber separated from each other by a movable wall, a control valve which comprises a housing coupled workingly to said movable wall and which is capable of controlling the supply of atmospheric pressure or above-atmospheric to the working chamber in dependence upon the displacement of an input element of the brake booster to achieve a pressure difference at the movable wall, a sensing disk disposed in an axially displaceable manner inside the control valve housing, and a coupling device which introduces forces acting counter to the actuating direction upon the sensing disk in a coupled position into the control valve housing and in an uncoupled position via an actuating piston into the input element, wherein the coupling device comprises a coupling element for introducing the forces acting counter to actuating direction into the control valve housing as well as an axially displaceable actuating element.

Vacuum brake boosters have been known for quite some time and millions of them are being used to boost the actuating forces of a vehicle hydraulic brake system and therefore keep said forces at a level which is acceptable to the driver of a vehicle. Likewise known are so-called emergency braking aids, which are frequently also referred to as "brake assistants". These are devices which provide a driver in an emergency braking situation with increased braking power for substantially the same actuating force.

Emergency braking aids may be divided into electromagnetically actuated and mechanically actuated systems. For reasons of cost, the use of a mechanical system is preferred for applications in vehicles at the lower end of the price range.

A vacuum brake booster having such a mechanical emergency braking aid is known, for example, from DE 198 31 962 A1. Said vacuum brake booster has a vacuum chamber and a working chamber separated from each other in a pressure-proof manner by a movable wall. A control valve, which has a housing workingly coupled to the movable wall, comprises an atmospheric valve seat which, to achieve a pressure difference at the movable wall, is capable of controlling the supply of atmospheric pressure to the working chamber in dependence upon the displacement of an input element of the brake booster.

The input element is coupled in actuating direction to an actuating piston. In the context of the present invention, the term "actuating direction" is always the actuating direction of the brake booster. Disposed in actuating direction downstream of the actuating piston is a sensing disk, which cooperates with the reaction disk of a power delivery element. Said axially displaceable sensing disk allows the transmission of a load from and to the actuating piston.

For improved boosting of the braking force in emergency braking situations, a mechanical emergency braking aid is disposed in the control valve housing. The emergency braking aid comprises a coupling device which introduces reaction forces of the master brake cylinder, which act counter to actuating direction upon the sensing disk, in a coupled position into the control valve housing and in an uncoupled position via the actuating piston into the input element. In an emergency braking situation the coupling device adopts the coupling position so that the reaction forces of the master brake cylinder are introduced into the control valve housing and the holding load, which is to be summoned up by the driver and is introduced via the input element into the brake booster, is reduced by the reaction forces. To maintain the brake pressure, the driver therefore has to summon up only a relatively low actuating force.

The coupling device according to DE 198 31 961 A1 comprises a coupling element having two halves, which are displaceable in a radially outward direction and provided with sloping surfaces and which cooperate with corresponding sloping surfaces of an axially displaceable actuating element in order to effect radially outward displacement of the coupling element halves. In coupled state, the displaced coupling element halves engage behind a stop of the control valve housing so that reaction forces acting counter to actuating direction upon the sensing disk are transmitted from the sensing disk to the coupling element halves and from the latter to the control valve housing.

SUMMARY OF THE INVENTION

The object of the invention is to provide a differently designed brake booster with mechanical emergency braking aid.

Proceeding from a brake booster of the type described initially, said object is achieved according to the invention in that the coupling device comprises a detent element, which is movable in radial direction and disposed radially outside of the coupling element, and the coupling element, radially at the outside has a stop for the detent element, wherein in the coupled position the forces acting counter to actuating direction are introduced by the coupling element via the stop and the detent element into the control valve housing.

The above references and all subsequent references to radial positions and directions relate to a longitudinal axis of the control valve housing and contain no information regarding the shape of the individual components of the coupling device. The individual components of the coupling device are indeed preferably but not necessarily e.g. annular, cylindrical or hollow-cylindrical in shape.

According to the invention, the radial and axial position of the detent element relative to the coupling element decides whether the coupling device is in a coupled or an uncoupled position. When the detent element is situated relative to the coupling element e.g. so far radially inside and/or in such an axial position that it comes into contact with the stop of the coupling element (detent position), then the coupling device is in a coupled position and the reaction forces of the master brake cylinder introduced into the coupling element are transmitted from the coupling element to the stop, from the stop to the detent element and from the detent element to the control valve housing. On the other hand, no reaction forces are then introduced into the actuating piston and the input element.

When, however, the detent element is situated relative to the coupling element e.g. so far radially outside and/or in such an axial position that it is not in contact with the stop of the coupling element, then the coupling element may not be supported against the control valve housing and the reaction forces of the master brake cylinder are transmitted via the sensing disk and the coupling device to the actuating piston and from the latter to the input element. The coupling device is situated, in said case, in an uncoupled position.

Preferentially, not only the detent element but also the coupling element are movable in radial direction so that a radial movement of the coupling element is transmissible to the detent element, which radially surrounds the outside of the coupling element. By virtue of radially outward displacement of the coupling element the coupling element may then be brought, for example, into frictionally engaged contact with the detent element so that an axial movement of the radially outwardly moved coupling element may also be transmitted to the detent element.

An axial movement relative to the actuating element may, for example, be used to move the coupling element in radial direction. To said end, the actuating element is provided e.g. with sloping surfaces which, in the event of a relative movement between actuating element and coupling element, cooperate with the coupling element in such a way that it is moved radially outwards. An actuating element designed in said manner preferably has sloping surfaces in the form of a conical portion, the diameter of which increases in actuating direction, and is disposed in actuating direction downstream of the coupling element and upstream of the sensing disk. In a particularly preferred manner, the actuating element, radially at the outside, has a stop for the coupling element to prevent actuating element and coupling element from being displaced too far relative to one another.

According to a preferred embodiment, coupling element and/or detent element are substantially annular in shape. The coupling element may be e.g. a clamping ring, which is preloaded or preloadable in a radially inward direction and in its starting position is connected e.g. positively and/or non-positively to the actuating piston. The actuating piston preferably has a stop for the coupling element to prevent the latter from being displaced too far counter to actuating direction relative to the actuating piston. The detent element as well may be designed in such a way that it is preloaded or preloadable in a radially inward direction. It is thereby guaranteed that the detent element after cooperating with the coupling element may automatically readopt its radial starting position.

According to a particularly preferred embodiment, the stop provided on the coupling element for the detent element is designed as a step, the radial extension of which increases in actuating direction, and is formed on an end of the coupling element facing the input element. In addition to said stop of the coupling element designed e.g. as a step, a further stop for the detent element may be provided counter to actuating direction e.g. in the form of a step in the control valve housing. The detent element is preferably preloaded counter to actuating direction towards the stop in the control valve housing.

The coupling device may further comprise a holding device for the detent element, which is disposed radially outside of the detent element. The holding device is preferably provided radially at the inside with a groove, in which the detent element is guidable. The holding device may moreover be designed so as to be movable in axial direction so that the detent element accommodated in the groove may be driven in axial direction by the holding device. In the case of an e.g. frictionally engaged or non-positive connection between the coupling element and the detent element, the holding device may therefore follow an axial displacement of the coupling element.

The holding device may be preloaded counter to the actuating direction e.g. towards a stop in the control valve housing. It is thereby guaranteed that, after axial displacement of the holding device, the latter following cancellation of the connection between detent element and coupling element returns into its axial starting position.

DETAILED DESCRIPTION OF THE INVENTION

Figure 1:
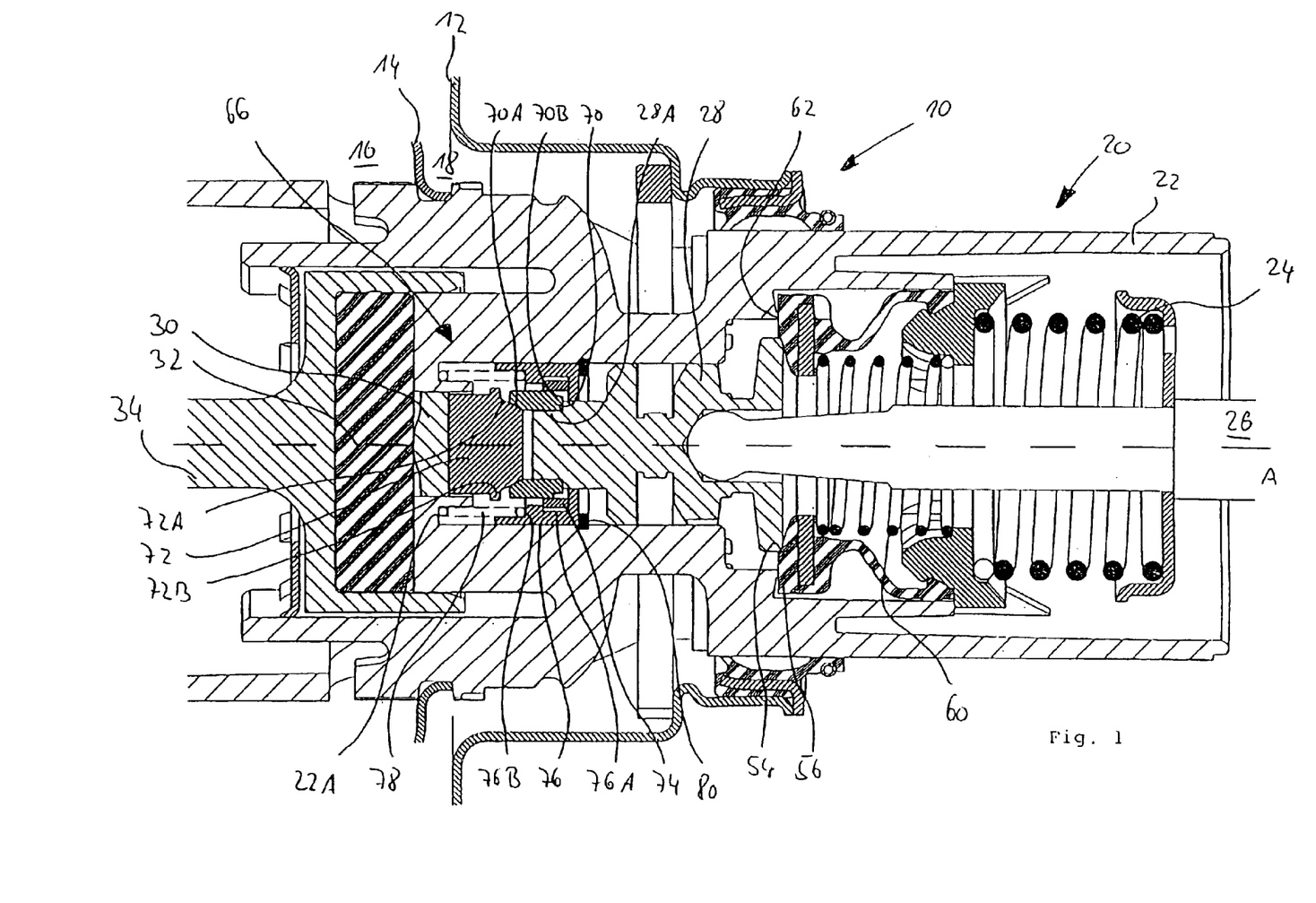
FIG. 1 a longitudinal section through the control valve of a vacuum brake booster according to the invention in standby position.

FIG. 1 shows a vacuum brake booster 10 having a housing 12, in which a movable wall 14 separates a vacuum chamber 16 in a pressure-proof manner from a working chamber 18.

During operation of the brake booster 10 the vacuum chamber 16 is constantly connected to a vacuum source, e.g. to the intake tract of an international combustion engine or to a vacuum pump. A control valve 20 having a housing 22 may connect either the working chamber 18 to the vacuum chamber 16, in order to evacuate the working chamber 18, or the evacuated working chamber 18 to the ambient atmosphere, i.e. the ambient pressure, in order to generate a pressure difference at the movable wall 14. The movable wall 14 is workingly coupled to the control valve housing 22.

The brake booster 10 is actuated by means of a rod-shaped input element 26, which is preloaded into its starting position by a spring 24, projects along an axis A into the control valve housing 22 and is fastened by its one, spherically designed end in an actuating piston 28.

The end of the actuating piston 28 remote from the spherically designed end of the input element 26 is in contact, via a coupling device 66 described in detail further below, with a sensing disk 30 which transmits an actuating force, which is introduced via the input element 26 into the brake booster 10, via a reaction disk 32 made of elastomeric material to a reaction piston 34 of a master cylinder, disposed functionally downstream of the brake booster 10 and not shown here, of a vehicle hydraulic brake system. The reaction disk 32 brings together the actuating force summoned up by the driver and the booster force.

A first annular valve seat 54 of the control valve 20 is formed on the end of the actuating piston 28 facing the input element 26. The first valve seat 54 cooperates with a likewise annular valve sealing element 56 preloaded towards it by a spring 60 and may control the connection between the ambient atmosphere and the working chamber 18 of the brake booster 10. A second annular valve seat 62 of the control valve 20 is formed radially outside of and concentrically with the first valve seat 54 and at the inside of the control valve housing 22 and cooperates likewise with the valve sealing element 56 and may control the connection between the vacuum chamber 16 and the working chamber 18 of the brake booster 10.

In actuating direction downstream of the actuating piston 28 a coupling device 66 is shown in a standby position, in which the driver is not introducing any actuating force into the brake booster. In dependence upon the actuating speed, the coupling device may be moved from said standby position into a coupled position.

The coupling device 66 shown in a standby position in FIG. 1 comprises a coupling element in the form of a clamping ring 70, which cooperates with an actuating element in the form of a conical component 72 disposed in actuating direction upstream thereof.

The clamping ring 70 may expand radially relative to the housing longitudinal axis A and is provided for said purpose with a non-illustrated axial slot. In the standby position shown in FIG. 1, the clamping ring 70 is connected non-positively and positively to a step 28A of the actuating piston. The step 28A is formed at an end of the actuating piston 28 facing the vacuum chamber 16 and has a diameter decreasing in actuating direction.

The clamping ring 70 at its end facing the conical component 72 has a flattened portion 70A, which cooperates with the conical portion 72A of the conical component 72. The clamping ring 70 at its other end facing the input element 26 has a stop in the form of a step 70B for a detent element in the form of a metal detent ring 74, which radially surrounds the outside of the clamping ring. Like the clamping ring 70, the detent ring 74 may also be expanded in a radially outward direction.

In the standby position shown in FIG. 1, the axial position of the detent ring 74 relative to the clamping ring 70 is selected in such a way that the detent ring 74 is situated radially outside of the clamping ring 70 in abutment with the region of the clamping ring 70 having the largest outside diameter. This means that the detent ring 74 in the standby position, while being in abutment with the clamping ring 70, is not however latched into the step of the clamping ring 70.

The detent element 74 is guided in a radially displaceable manner inside a groove 76A of a holding device 76. The holding device 76 is in turn guided in an axially displaceable manner inside the control valve housing 22 and preloaded by a resilient element in the form of a return spring 78 counter to the actuating direction towards an annular stop 80 fastened in the control valve housing 22. The return spring 78 is supported by its one end in a recess 22A of the control valve housing 22 and by its other end against a stop 76B of the holding device 76.

Figure 2:
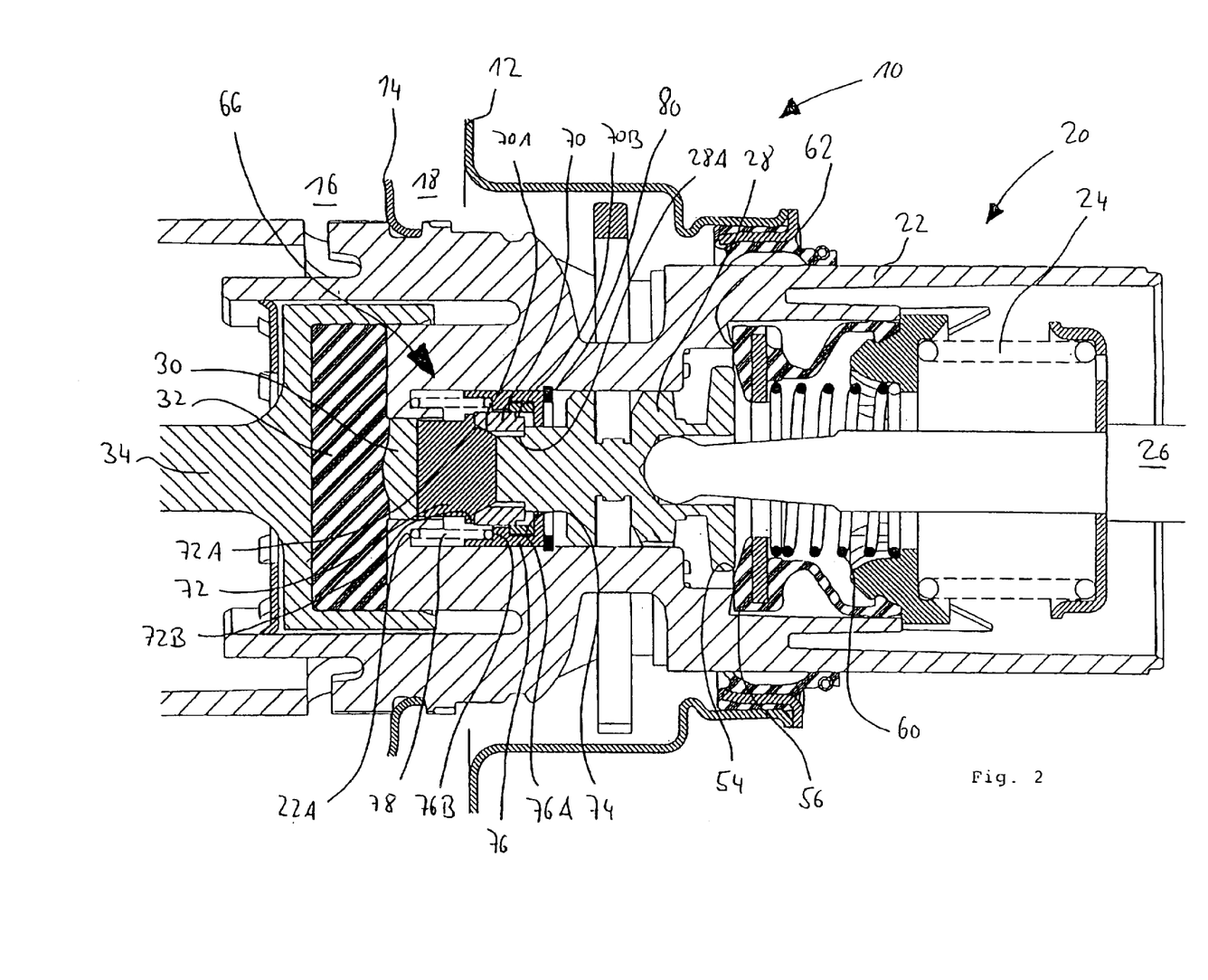
FIG. 2 a longitudinal section through the control valve according to FIG. 1 during normal braking.

Upon actuation of the brake booster 10, the first valve seat 54 of the control valve 20 in dependence upon the displacement of the input element 26 relative to the control valve housing 22 is opened to a greater or lesser extent, thereby producing a corresponding boosting force of the brake booster 10 resulting from the pressure difference currently effective at the movable wall 14. Such an operating position of the brake booster 10, with the valve seat 54 opened slightly as a result of normal brake actuation, is shown in FIG. 2.

The master brake cylinder reacts to the, during normal braking, comparatively slow actuating speed of the input element 26 and of the actuating piston 28 coupled to the input element 26 with a progressively higher reaction force, which is transmitted via the reaction piston 34, the reaction disk 32 and the sensing disk 30 to the conical component 72. By virtue of said constellation of forces, the clamping ring 70 disposed between the actuating piston 28 and the conical component 72 is displaced in the direction of the conical component 72. At the same time, the sloping surfaces 70A of the clamping ring 70 cooperate with the conical portion 72A of the conical component 72 in such a way that the clamping ring 70 is deformed in a radially outward direction. The radial deformation of the clamping ring 70 is limited by the actuating piston 28 coming into abutment with an end face of the conical component 72 facing the input element 26 and/or by the clamping ring 70 coming into abutment with a stop 72B formed on the outside diameter of the conical component 72.

The radially outward movement of the clamping ring 70 is guided along an end face—facing the vacuum chamber 16—of the step 28A of the actuating piston 28. At the same time, by means of said end face of the step 28A the clamping ring 70 is displaced axially in actuating direction. During normal braking, however, the clamping ring 70 is not displaced relative to the detent ring 74 far enough to allow the detent ring 74 to latch positively into the shoulder 70B of the clamping ring 70.

The detent ring 74 situated in abutment with the outside diameter of the clamping ring 70 also participates in said radially outward movement of the clamping ring 70. The detent ring 74 is in said case displaced radially outwards inside the groove 76A of the holding device 76.

In the actuating position of the brake booster 10 shown in FIG. 2, the coupling device is situated in an uncoupled position because the initially mentioned reaction forces of the master brake cylinder are transmitted to the conical component 72, from the latter to the actuating piston 28 and from the actuating piston 28 to the input element 26. In the absence of a coupling of detent element 74 and clamping ring 70 counter to actuating direction, no reaction forces are introduced into the control valve housing 22.

If, from the operating position of the brake booster shown in FIG. 2, the actuating force is increased further, the situation may arise where the full-output position, in which the maximum possible pressure difference is attained at the movable wall 14, is exceeded. The brake booster 10 is then situated in the operating position shown in FIG. 3, in which the actuating piston 28 has been displaced still further in actuating direction and the valve seat 54 has been opened even further.

Figure 3:
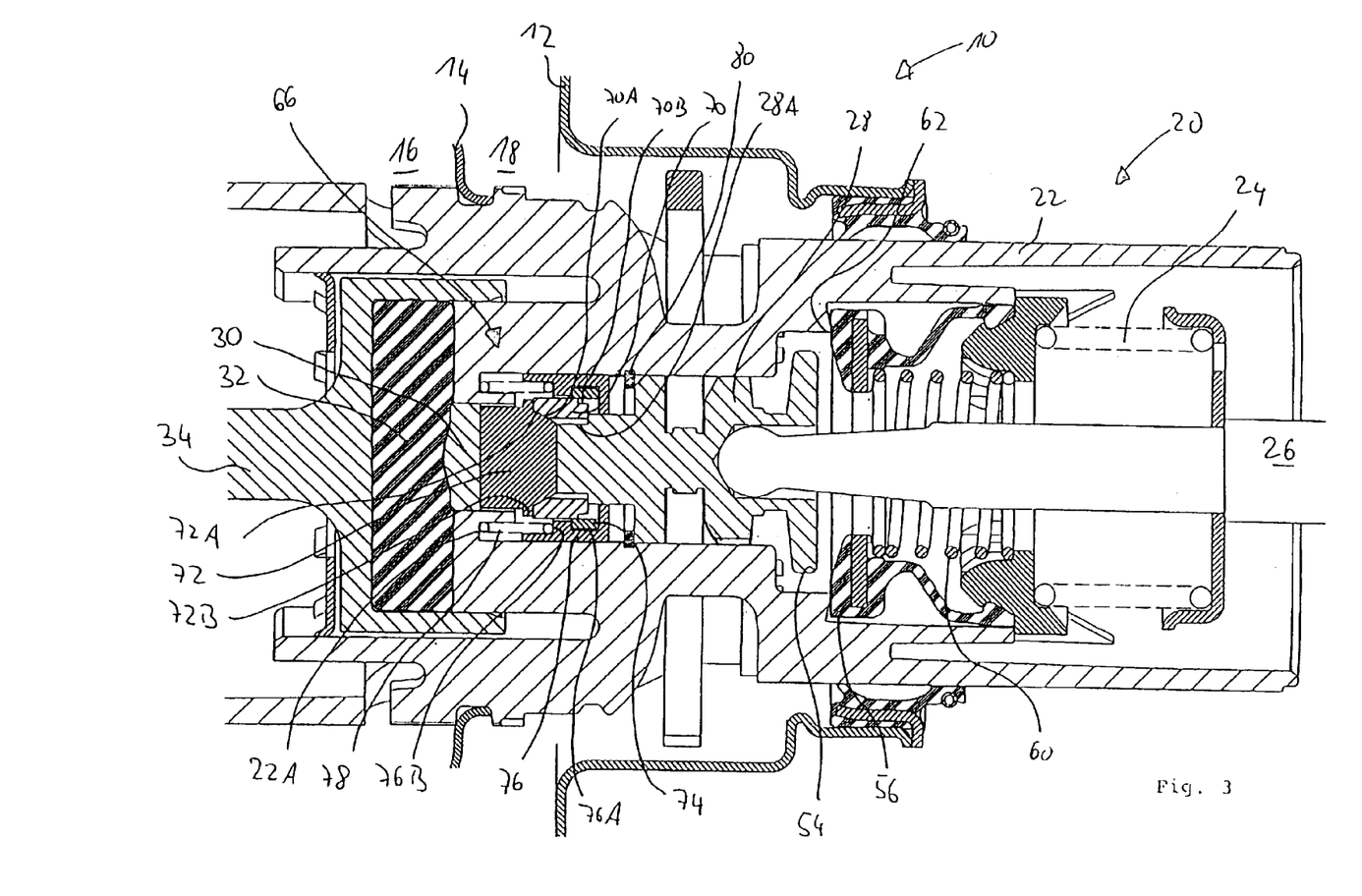
FIG. 3 a longitudinal section through the control valve according to FIG. 1 during normal braking after the full-output pressure has been exceeded.

In the operating position of the brake booster 10 shown in FIG. 3, because of the radially outward expansion of the clamping ring 70, the latter is jammed in a frictionally engaged manner with the detent ring 74. The holding device 76 is consequently coupled in axial direction via the detent ring 74 and the clamping ring 70 to the actuating piston 28. A further increase of the actuating force summoned up by the driver then results in the holding device 76 participating in a movement of the actuating piston 28 in actuating direction and being displaced counter to the return spring 78.

The coupling of the detent ring 74, which is disposed inside the holding device 76, in actuating direction to the clamping ring 70 prevents the clamping ring 70 from being displaced in actuating direction relative to the detent ring 74. Consequently, a positive latching of the holding device 76 into the step 70B, which according to the explanations below would entail an inappropriate activation of the coupling device, is avoided. Thus, in the operating position of the brake booster 10 shown in FIG. 3 too, the coupling device 66 remains uncoupled and the reaction forces of the master brake cylinder, which act upon the conical component 72, are introduced entirely into the actuating piston 28.

A reduction of the actuating force summoned up by the driver is sufficient to release the brake. The input element 26 and the actuating piston 28 are then displaced counter to actuating direction into their starting position by the return spring 24. Furthermore, by virtue of the return stroke of the valve seat 54 formed on the actuating piston 28 the valve sealing element 56 is lifted off the valve seat 62 so that the usual pressure equalization can take place at the movable wall 14.

By virtue of the return stroke of the actuating piston 28 the force introduced by the conical component 72 into the clamping ring 70 is reduced so that the clamping ring 70 moves radially inwards. At the same time, the frictional engagement between the clamping ring 70 and the detent ring 74 is cancelled and the holding device 76 is preloaded by the return spring 78 back against the stop 80.

Figure 4:
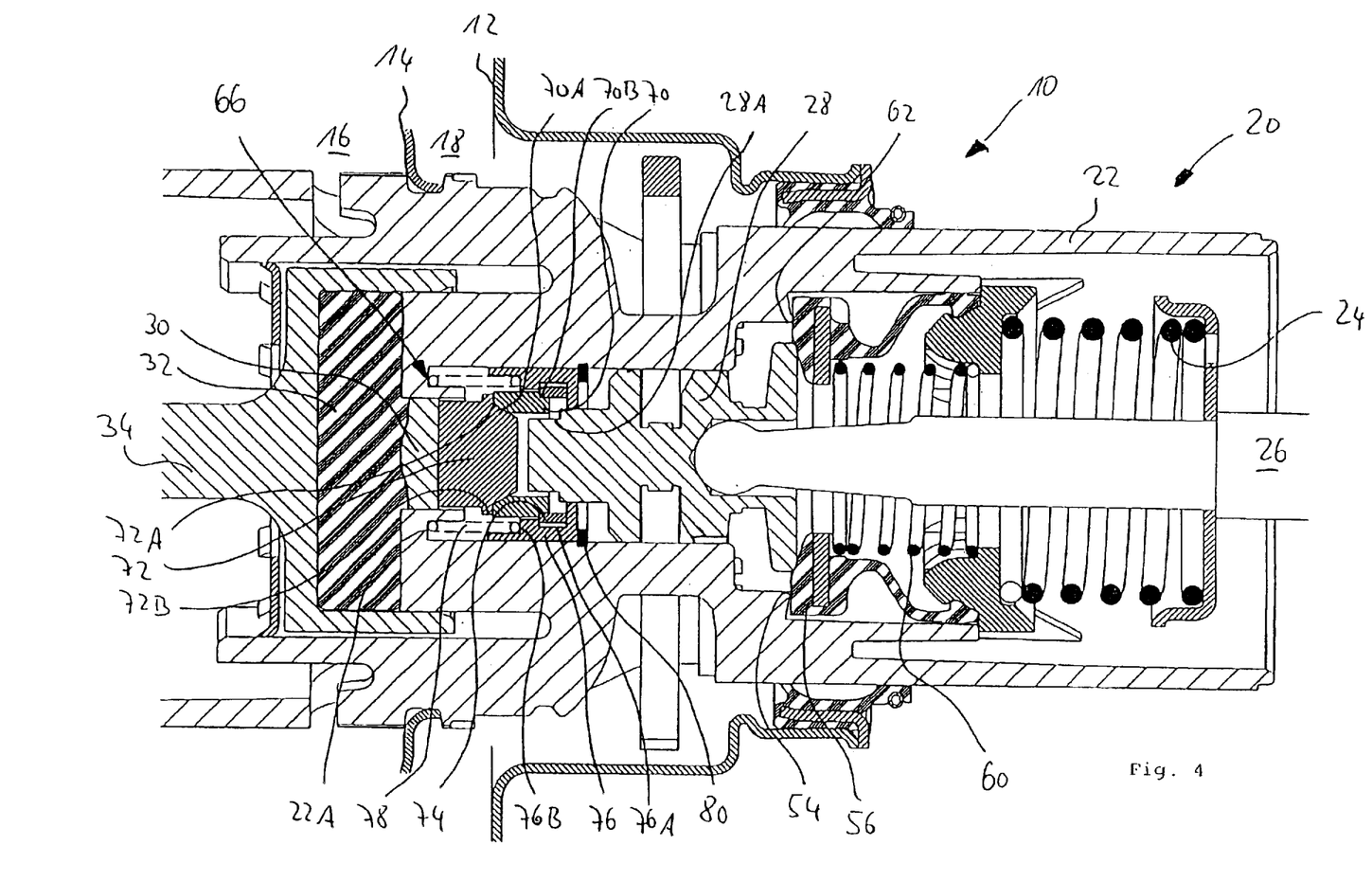
FIG. 4 a longitudinal section through the control valve according to FIG. 1 with the emergency braking aid activated.

When, in an emergency braking situation, actuation of the input element 26 is effected at a high actuating speed and with a comparatively large stroke, the clamping ring 70 is initially displaced axially in actuating direction. Because of the relative displacement between the clamping ring 70 and the detent ring 74, the detent ring may latch positively into the step 70B of the clamping ring 70. In the latched state of the detent ring 74, the coupling device 66 is situated in a coupled position. Said operating position of the brake booster 10 is shown in FIG. 4.

After latching of the detent ring 74 into the step 70B of the clamping ring 70, the reaction forces of the master brake cylinder transmitted to the conical component 72 may be introduced via the stop 72B of the conical component 72, the clamping ring 70, the detent ring 74, the holding device 76 and the stop 80 into the control valve housing 22. By virtue of the input element 26 being relieved of the reaction forces of the master brake cylinder, the actuating force to be summoned up by the driver to maintain the brake pressure is reduced, the emergency braking aid is activated.

Only after or shortly before said latching, the clamping ring 70 as a result of cooperating with the conical component 72 is expanded in a radially outward direction. The detent ring 74, which is situated in positive abutment with the step 70B of the clamping ring 70, also participates in said radially outward movement of the clamping ring 70. The detent ring 74 is consequently displaced radially outwards inside the groove 76A of the holding device 76.

A reduction of the actuating force summoned up by the driver is again sufficient to release the brake, after which the input element 26 and the actuating piston 28 coupled to the input element 26 are displaced counter to actuating direction by the return spring 24.

To return the coupling device 66 from the coupled position to the standby position it is necessary for the forces acting counter to actuating direction upon the conical component 72 to be reduced to such an extent that the conical component 72 may yield in actuating direction. The conical component 72 then pushes itself out of the clamping ring 70 and the coupling device 66 readopts the position shown in FIG. 1.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Brake booster, comprising
   a vacuum chamber and a working chamber separated from each other by a movable wall,
   a control valve, which comprises a housing coupled workingly to the movable wall and which is capable of controlling the supply of atmospheric pressure or above-atmospheric pressure to the working chamber in dependence upon the displacement of an input element of the brake booster to achieve a pressure difference at the movable wall,
   a sensing disk, which is disposed in an axially displaceable manner inside the control valve housing, and
   a coupling device for introducing forces acting counter to the actuating direction of the brake booster upon the sensing disk in a coupled position into the control valve housing and in an uncoupled position via an actuating piston into the input element, wherein the coupling device comprises a coupling element for introducing the forces acting counter to the actuating direction into the control valve housing and an axially displaceable actuating element adapted for cooperation with the coupling element to move the coupling device into the coupled position,
   wherein the coupling device comprises a detent element movable in a radial direction and disposed radially outside of the coupling element, and wherein the coupling element has a stop for the detent element radially at the outside of the coupling element, and wherein in the coupled position the forces acting counter to the actuating direction are introduced by the actuating element to the coupling element and from the coupling element via the stop and the detent element into the control valve housing.

2. Brake booster according to claim 1, wherein the coupling element is movable in a radial direction.

3. Brake booster according to claim 1, wherein the actuating element has sloping surfaces and cooperates with the coupling element via said sloping surfaces.

4. Brake booster according to claim 3, wherein the actuating element comprises a conical portion having a diameter increasing in the actuating direction, and is disposed in the actuating direction downstream of the coupling element.

5. Brake booster according to claim 3, wherein the actuating element has a stop for the coupling element in the actuating direction.

6. Brake booster according to claim 1, wherein the coupling element is substantially annular in shape.

7. Brake booster according to claim 1, wherein the coupling element is preloaded or preloadable in a radial inward direction.

8. Brake booster according to claim 7, wherein the coupling element is a clamping ring.

9. Brake booster according to claim 1, wherein counter to actuating direction, the input piston has a stop for the coupling element.

10. Brake booster according to claim 1, wherein the detent element is substantially annular in shape.

11. Brake booster according to claim 1, wherein the detent element is preloaded or preloadable in a radial inward direction.

12. Brake booster according to claim 1, wherein a stop is provided for the detent element, counter to the actuating direction, in the control valve housing.

13. Brake booster according to claim 1, wherein the detent element is axially displaceable and preloaded counter to actuating direction.

14. Brake booster according to claim 1, wherein the coupling device comprises a holding device which is disposed radially outside of the content element.

15. Brake booster according to claim 14, wherein the holding device has a groove radially at the inside, in which the detent element is guided.

16. Brake booster according to claim 14, wherein the holding device is movable in axial direction.

17. Brake booster according to claim 14, wherein in the holding device is preloaded counter to the actuating direction.

* * * * *

UNITED STATES PATENT AND TRADEMARK OFFICE
CERTIFICATE OF CORRECTION

PATENT NO. : 6,843,161 B2
DATED : January 18, 2005
INVENTOR(S) : Peter Schluter

It is certified that error appears in the above-identified patent and that said Letters Patent is hereby corrected as shown below:

Column 9,
Line 6, delete "content" and insert -- detent --.

Signed and Sealed this

Twelfth Day of April, 2005

JON W. DUDAS
*Director of the United States Patent and Trademark Office*